(12) United States Patent
Wattyn

(10) Patent No.: US 12,285,858 B2
(45) Date of Patent: Apr. 29, 2025

(54) APPARATUS AND METHODS FOR MANIPULATING PLATES

(71) Applicant: XSYS PREPRESS NV, Ypres (BE)

(72) Inventor: Bart Marc Luc Wattyn, Dentergem (BE)

(73) Assignee: XSYS PREPRESS NV, Ypres (BE)

( * ) Notice: Subject to any disclaimer, the term of this patent is extended or adjusted under 35 U.S.C. 154(b) by 9 days.

(21) Appl. No.: 18/267,821

(22) PCT Filed: Dec. 17, 2021

(86) PCT No.: PCT/EP2021/086502
§ 371 (c)(1),
(2) Date: Jun. 16, 2023

(87) PCT Pub. No.: WO2022/129531
PCT Pub. Date: Jun. 23, 2022

(65) Prior Publication Data
US 2024/0051119 A1 Feb. 15, 2024

(30) Foreign Application Priority Data

Dec. 17, 2020 (NL) ........................................ 2027143
Dec. 17, 2020 (WO) ................. PCT/EP2020/086857
(Continued)

(51) Int. Cl.
B25J 9/04 (2006.01)
B25J 13/08 (2006.01)
(Continued)

(52) U.S. Cl.
CPC ............. *B25J 9/042* (2013.01); *B25J 13/089* (2013.01); *B25J 15/0616* (2013.01);
(Continued)

(58) Field of Classification Search
CPC ...... B24J 9/042; B24J 13/089; B24J 15/0616; B41C 1/006; B41F 27/1262;
(Continued)

(56) References Cited

U.S. PATENT DOCUMENTS 8,286,553 B2 * 10/2012 Faraz .................... B41F 27/005
101/481
2003/0056671 A1 * 3/2003 Hashiguchi .............. B41J 13/14
101/477
(Continued)

FOREIGN PATENT DOCUMENTS

| JP | 2001139138 A | 5/2001 |
|---|---|---|
| WO | 2017190169 A1 | 11/2017 |
| WO | 2019206911 A1 | 10/2019 |

OTHER PUBLICATIONS

International Search Report and Written Opinion mailed Apr. 21, 2022, for Application No. PCT/EP2021/086502 (14 pages).

*Primary Examiner* — David H Banh
(74) *Attorney, Agent, or Firm* — KDW Firm PLLC

(57) ABSTRACT

An apparatus for aligning an edge, such as a leading edge of a plate, in particular a printing plate or a printing plate precursor. The apparatus includes a support configured for supporting the plate on a support surface, and to be located upstream of a treatment station. At least two movable elements are arranged to be moved by an edge, such as a leading edge, of the plate. The at least two movable elements include a first and a second movable element; a detection means configured to detect a first and second measure representative for a first and second position of the first and second movable element, respectively, at least one controllable component configured to perform an action on the plate, and a control means configured to control the at least one controllable component based on the first and second measure.

19 Claims, 11 Drawing Sheets

(30) Foreign Application Priority Data

Apr. 16, 2021 (NL) ..................................... 2028000
Jul. 9, 2021 (NL) ..................................... 2028683

(51) Int. Cl.
  *B25J 15/06* (2006.01)
  *B41C 1/00* (2006.01)
  *B41F 27/12* (2006.01)
  *B41N 3/00* (2006.01)
  *B65G 49/06* (2006.01)

(52) U.S. Cl.
  CPC .......... *B41C 1/006* (2013.01); *B41F 27/1262* (2013.01); *B41F 27/1275* (2013.01); *B41N 3/00* (2013.01); *B41N 3/006* (2013.01); *B65G 49/061* (2013.01); *B41P 2227/60* (2013.01); *B65G 2203/0233* (2013.01)

(58) Field of Classification Search
  CPC ....... B41F 27/1275; B41N 3/00; B41N 3/006; B65G 49/061; B65G 2203/0233; B41P 2227/60
  See application file for complete search history.

(56) References Cited

U.S. PATENT DOCUMENTS

| | | | |
|---|---|---|---|
| 2004/0020386 A1* | 2/2004 | Koyanagi | B41C 1/1083 101/477 |
| 2004/0099165 A1* | 5/2004 | Hashiguchi | G03F 7/24 101/477 |
| 2004/0099168 A1* | 5/2004 | Hashiguchi | B41C 1/1083 101/477 |
| 2010/0013149 A1 | 1/2010 | Kondo | |
| 2010/0101439 A1* | 4/2010 | Funk | B41C 1/1083 101/486 |

* cited by examiner

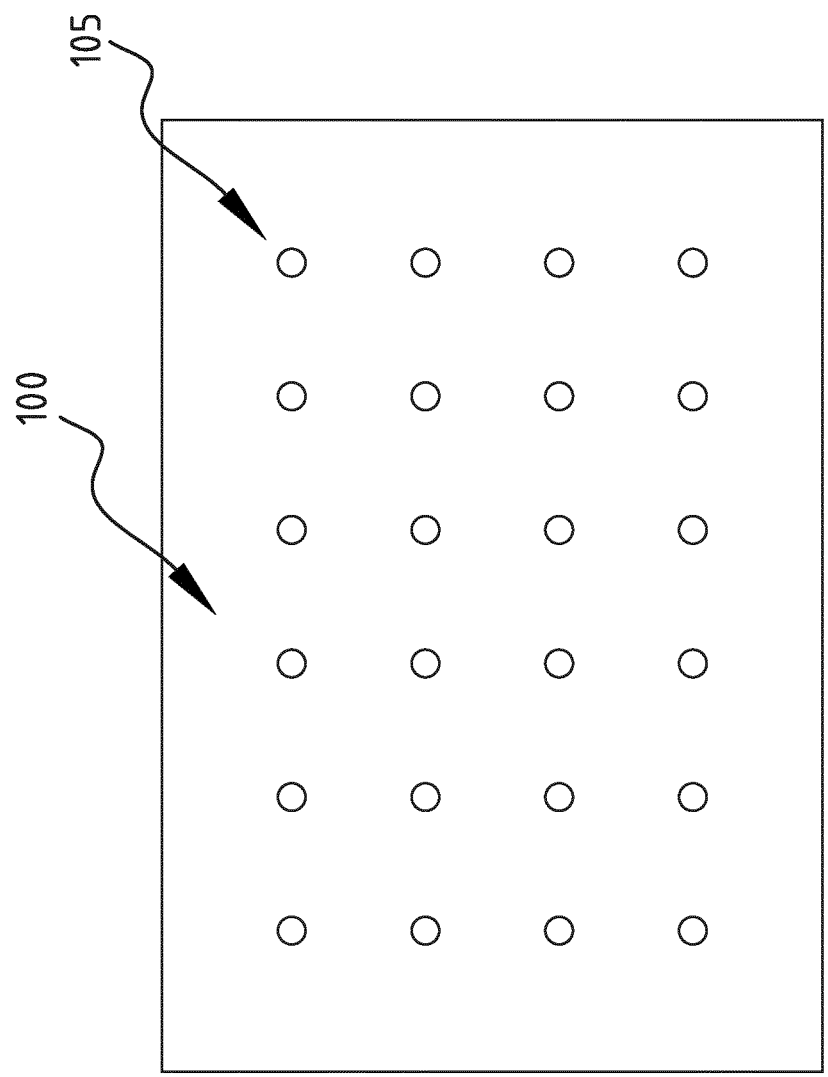
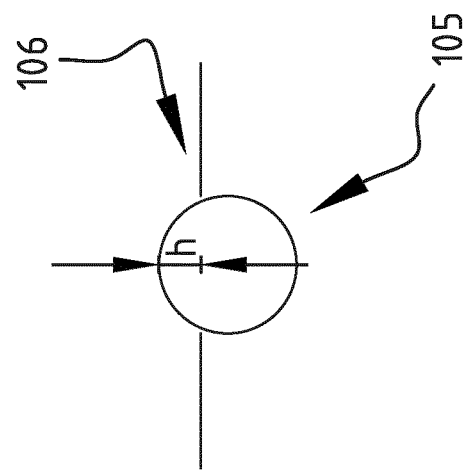
FIG. 7A
FIG. 7B

APPARATUS AND METHODS FOR MANIPULATING PLATES

"This application is a national stage filing under 35 U.S.C. 371 of pending International Application No. PCT/EP2021/086502, filed Dec. 17, 2021, which claims priority to International Application No. PCT/EP2020/086857, filed Dec. 17, 2020, Netherlands Patent Application No. 2027143, filed Dec. 17, 2020, Netherlands Patent Application No. 2028000, filed Apr. 16, 2021, and Netherlands Patent Application No. 2028683, filed Jul. 9, 2021, the entirety of which applications are incorporated by reference herein."

FIELD OF INVENTION

The field of the invention relates to an apparatus and methods for manipulating plates, in particular printing plates or printing plate precursors. More in particular the invention relates to an apparatus and method for aligning a leading edge of a plate, and to an apparatus and method for moving a plate, in particular a flexible plate.

BACKGROUND

Printing plates need to be transported between various treatment stations. Examples of treatments to which a printing plate may be subjected are: cutting, ablation, exposure to electromagnetic radiation, developing, washing, brushing, rinsing, spraying, drying, irradiating, heating, cooling, removing of material, treating with gases or liquids, sanding, cutting, treating with electromagnetic waves and combinations thereof.

For flexographic printing automated movement of the plates has been used for the transport of the plates inside the washing station and for preceding or following process steps. For example, plates are moved from an imaging station to a curing station to a washer station. Known systems may use conveyor belts. Further, a transport bar may be used to move a printing plate precursor, e.g. through a washer station. To that end an area of the printing plate precursor may be provided with a series of through-holes in a punching station. An example of a washer apparatus with a transport bar system is disclosed in PCT application PCT/EP2019/060370 in the name of the applicant. However, the use of conveyors and transport bar systems cannot be used in all parts of the process.

When transporting printing plates between different treatment stations, the printing plate may have to be aligned and/or translated and/or rotated. Existing automated plate transport systems are not suitable for all steps. Especially when a plate needs to be aligned and/or rotated often a human operator may have to manipulate and position the plate.

Accordingly, there is a need in the art for improved systems for plate transport and alignment to reduce operator handling.

SUMMARY

The object of embodiments of the invention is to provide an apparatus and method for aligning an edge, typically a leading edge of a plate, which are robust and simple and provide reliable results. According to a first aspect of the invention, there is provided an apparatus for aligning an edge of a plate, in particular a printing plate or a printing plate precursor. The apparatus comprises a support, at least two movable elements, a detection means, at least one controllable component and a control means. The support is configured for supporting the plate in a support surface, and intended to be located upstream of a treatment station, e.g. a washer station. The at least two movable elements are arranged to be moved by the edge, typically the leading edge, of the plate. The at least two movable elements comprise a first and a second movable element. The detection means is configured to detect a first and second measure representative for a first and second position of the first and second movable element, respectively. The at least one controllable component is configured to perform an action on the plate. The control means is configured to control the at least one controllable component based on the first and second measure.

By using at least two movable elements in combination with a detection means to detect a first and second measure representative for a first and second position of the first and second movable element, it can be determined whether or not the edge of the plate is aligned. This is a robust and simple means which can be easily added to any support, and which provides reliable results. In that manner the process can be faster and less handling by an operator is required. Further, compared to prior art solutions where an edge is detected directly using e.g. an optical sensor, embodiments of the invention have the advantage that—because the detection means detects a measure representative for a position of a movable element—the detection means can be arranged so that it is not influenced by changing environmental conditions such as an image on the plate.

Preferably, the at least two movable elements are arranged so that they protrude through said support surface in a start position of the at least two movable elements. Such an embodiment has the advantage that the movable elements will not be in the way of other components and that the detection can be done below the support surface. However, in other embodiments, the movable elements may be provided above the support surface, and the plate may then pass below the movable elements.

Preferably, the at least one controllable component comprises a moving means configured to move the plate over the support surface. In that manner, the movement of the plate can be controlled by the control means in function of the first and second measure measured by the detection means. For example, the moving means may be configured to rotate the plate around an axis perpendicular on the support surface in order to improve the alignment, and once the difference between the first and the second measure is below a predetermined threshold, it may be determined that the plate is aligned.

In a preferred embodiment, the moving means is configured to rotate the plate around an axis perpendicular on the support surface and to translate the plate parallel to the support surface. The control means may then be configured to first translate and/or rotate the plate until the edge is in contact with the at least two movable elements, whereupon the plate may be further rotated until the difference between the first and the second measure is below a predetermined threshold, whereupon the plate may be further translated over or below the at least two movable elements.

Preferably, the at least two movable elements are at least two pivotable pins arranged to be pivoted by the edge of the plate. Pivotable elements are easy to mount either in a support such that they protrude through the support surface, or above the support, and the angle over which the pivotable elements pivot, is a direct and accurate measure of the location of the contact point with the edge.

More preferably, the at least two pivotable pins comprise a first and a second pivotable pin, and the detection means is configured to detect a first and second measure representative for a first and second angle of the first and second pivotable pin. The at least two pivotable pins may extend below and/or above the support surface, and the detection means, e.g. an angle detection means, can be provided either below the support surface where it is not influenced by measurement disturbing factors, or above the support at a distance of the support surface and preferably such that it is not influenced by a characteristic, such as an image or color, of the plate.

In an exemplary embodiment, the at least two pins are arranged and configured such that they orient themselves in an upstream direction, when untouched by the edge of the plate, preferably at an angle between 15 and 75 degrees with respect to the support surface. In that manner, for example, a pin can gradually move from a first start position in which the pin points in an upstream direction (i.e. in a direction where the approaching edge is coming from) to a position perpendicular on the support surface to a position where the pin is oriented in a downstream direction and the plate can move over the pins.

In an exemplary embodiment, the at least two pivotable pins are movable between a start position and an end position, and a biasing means, such as counterweights attached the at least two pivotable pins or a spring means, is configured to exert a force in the upstream direction against the edge of the plate, wherein optionally a further biasing means, such as a piston, is provided to force the at least two pivotable pins in the end position. Preferably, the end position is a position below the support surface or well above the support surface in order to avoid damage.

In an exemplary embodiment, the at least two pivotable pins are pivotally arranged around a pivot axis, and the pivot axis is located at a distance greater than 5 cm below or above the support surface, preferably at a distance greater than 10 cm below or above the support surface. In that manner, the edge can move over a relatively large distance over the support surface whilst maintaining in contact with the pivotable pins. Indeed, the larger the distance between the pivot axis and the support surface, the larger the distance over which the edge can move parallel to the support whilst being in contact with the gradually pivoting pins. This will further improve the accuracy of the alignment of the plate.

In a preferred embodiment, the at least two movable elements and the support are configured such that the at least two movable elements can be moved below or well above the support surface or flush with the support surface as the plate passes over or underneath the at least two movable elements. Such an embodiment, is particularly advantageous when it is desired to first align a plate which is moving in a machine transport direction, and to next move the plate further in the machine transport direction, over the at least two movable element. However, in other embodiment, where the at least one controllable component comprises e.g. a punching means, it may not be required that the at least two movable elements can be moved below or well above the support surface. In that case a punching action may take place when the difference between the first and the second measure is below a predetermined threshold whereupon the plate may be removed without having to pass over or below the at least two movable elements.

According to an exemplary embodiment, the support is a support table provided with at least two slits through which the at least two movable elements protrude. When the movable elements are pivotable pins, the slits may be dimensioned such that a pivotable pin can move from a rest position where the pin is pointing in an upstream direction to a position where the pin points in a downstream direction, and optionally to an end position where the pin is located below the support surface or flush with the support surface.

According to an exemplary embodiment, each pivotable pin comprises a first elongate portion and a second elongate portion, wherein the second elongate portion is at an angle between 120 and 175 degrees with respect to the first elongate portion. Preferably, the second elongate portion extends at least partially above the support surface when in a start position, while the first elongate portion extends below the support surface.

According to a preferred embodiment, the detection means is provided below the support surface. In this manner the detection means is not disturbed by a changing environment such as the image on the plate. For example, when the movable elements are pivotable pins, the detections means may comprise an angle sensor for each pin, preferably arranged close to the pivot axis of the pivotable pins. According to another embodiment, the detection means is provided above the support surface, preferably such that it is not influenced by characteristics of the plate.

According to an exemplary embodiment, the support may be configured such that the support surface is an inclined surface. Especially when the treatment station downstream of the movable elements is a washer station, it may be advantageous to have a support surface sloping slight downward in the direction of the washer station.

According to an exemplary embodiment, the at least one controllable component comprises any one or more of the following: a punching means, a plate coupling means, a plate gripping means.

According to an exemplary embodiment, the moving means comprises any one or more of the following; at least one robotic arm, a set of rollers, a set of chains, a set of belts.

According to a preferred embodiment, the at least two movable elements are intended to engage the leading edge of the plate and are used for aligning the plate such that the leading edge is oriented substantially perpendicular to a machine transport direction in which the plate is intended to move through the apparatus.

According to another exemplary embodiment, the at least two movable elements may be used for centering the plate, wherein a side edge contacts one of the movable elements. For such an embodiment, the moving means is preferably configured to translate the plate parallel to the support surface in a direction perpendicular on the machine transport direction, wherein the control means is configured to control the movement means until the measure for the pin which contacts the side edge is within a predetermined range.

According to an exemplary embodiment, the moving means comprises an articulated operating arm configured to translate and/or rotate the plate such that an edge thereof moves in the direction of the at least two movable elements. Optionally, the moving means further comprises a plate engagement means at an end of the articulate operating arm, said plate engagement means being configured to contact the plate in such a way that a movement of the operating arm causes a sliding of the plate over the support surface. The plate engagement means may be a suction means, a clamping means, or simply a head with a contact surface which is pressed against the plate. In the latter case, the friction and/or adhesion between the contact surface and the plate may be sufficient to be able to slide the plate over the support surface.

Preferably, the control means is configured to compare the first and the second measure, and to determine that the edge of the plate is aligned or that the plate is centered if the difference between the first and the second measure is smaller than a predetermined threshold.

Preferably, the distance between the first and the second movable element is in the range of 10 cm to 1000 cm, preferably 10 to 500 cm, more preferably 10 to 100 cm.

In preferred embodiments two movable elements are used for aligning a leading edge. However, also three or more movable elements may be used.

In further developed embodiments two movable elements may be provided for aligning a leading edge of a plate moving in a machine transport direction, and one or two further movable elements may be provided for centering the plate in a direction perpendicular to the machine transport direction. When pivotable pins are used, the pins for aligning the leading edge may pivot in a plane parallel to the machine transport direction and perpendicular on the support surface, while the further one or more pins used for centering the plate may pivot in a plane perpendicular to the machine transport direction and perpendicular to the support surface.

Preferably, the plate is a rectangular plate.

The detection means may comprise any one of the following: an optical detection means, a proximity detection means, a pressure detection means, an electrical detection means, a magnetic detection means, a mechanical detection means, a ferrous/non-ferrous metal detection means, or a combination thereof. Examples of suitable detection means include an angle sensor, a proximity switch, a photo-sensor, a mechanical switch, a magnetic switch, a camera, etc. In a preferred embodiment the detections means comprise a first and a second detector to perform a detection at the first and the second movable element, respectively. However, certain detection means such as a camera could look both at the first and the second movable element.

In an embodiment where the at least one controllable component comprises a punching means, the punching means may comprise a drive means configured to arrange one or more penetration elements or perforating elements through or in an edge portion of the plate. The drive means may be e g a hammer arranged movably such that it can be engaged against the edge portion of the relief plate precursor in order to arrange the one or more penetration elements or perforating elements through or in an edge portion of the plate.

According to another aspect there is provided an apparatus for detecting or positioning an edge of a plate, in particular a printing plate or a printing plate precursor, said apparatus comprising: a support configured for supporting the plate in a support surface, and intended to be located upstream of a treatment station; at least one pivotable pin arranged to be moved by an edge of the plate; a detection means configured to detect at least one measure representative for a position of the at least one pivotable pin, wherein preferably the detection means is arranged below the support surface, at least one controllable component configured to perform an action on the plate; and a control means configured to control the at least one controllable component based on the at least one measure. Preferably, the at least one pivotable pin protrudes through said support surface.

Embodiments with a single pivotable pin may provide a simple and robust mechanism to detect an edge of a plate, and in particular the movement of an edge of a plate as it moves against, and optionally over or beneath the pivotable pin.

Any one of the features of the pivotable pin, the detection means, the controllable component, the support, and the control means, described above may also be used in embodiments of the last aspect.

According to an aspect of the invention there is provided a system comprising the apparatus of any one of the above described embodiments and a treatment station downstream of the support and configured for receiving the aligned plate.

According to an exemplary embodiment, the treatment in the treatment station is selected from the group comprising washing, brushing, rinsing, spraying, drying, irradiating, developing, heating, cooling, removing of material, treating with gases or liquids, sanding, cutting, treating with electromagnetic waves, ablation, measuring, and combinations thereof.

According to an exemplary embodiment, the treatment in the treatment station is a heat treatment resulting in a liquefied part of a relief plate precursor followed by contacting the liquefied part with a moving acceptor material, such as a web, a non woven material, or a foil to which molten material adheres, and continuously removing the liquefied part with the acceptor material.

According to a further aspect, there is provided a method for aligning an edge, typically a leading edge of a plate, the method comprising the steps of:
providing of a plate with at least one substantially linear edge, typically a leading edge,
coupling the plate to a moving means,
moving the plate over a support surface such that the edge is touching at least two movable elements;
detecting a position of the at least two movable elements;
controlling the moving means based on the result of the detecting.

The movable elements may have any one or more of the features described above. Preferably, the movable elements are pivotable elements.

Preferably, the at least two movable elements are arranged so that they protrude through the support surface in a start position of the at least two movable elements, wherein during the moving step the at least two movable elements move from said start position to an end position.

Alternatively, the at least two movable elements may be arranged above the support surface and may move upward when moving from a start position to an end position.

Optionally, the plate is decoupled from the moving means when is has been detected that the movement of the at least two movable elements caused by the leading edge is substantially the same.

Preferably, the step of controlling the moving means based on the result of the detecting comprises rotating and/or translating the plate until a difference in position between a first and a second movable element of the at least two movable elements is smaller than a predetermined threshold.

Preferably, the plate is a printing plate or a printing plate precursor. However the method may also be useful for other plates such as a printed circuit board, a card board, a piece of metal or wood etc.

Preferably, the step of moving comprises moving the plate such that its leading edge contacts the at least two movable elements, and the method further comprises feeding the plate to a treatment unit, when it is detected that a difference in position between a first and a second movable element of the at least two movable elements is smaller than a predetermined threshold.

Preferably, the at least two movable elements are moved below or well above the support surface so as to be located above the plate, as the plate is fed to the treatment unit.

In a possible embodiment, the method further comprises centring the plate with respect to an entrance of a treatment unit arranged downstream of the at least two movable elements. Optionally, the at least two movable elements comprise a first pair of movable elements and a third movable element, and the step of moving comprises moving a leading edge against the first pair of movable elements and moving a side edge of the plate against the third movable element, respectively. In that manner, both an alignment of the leading edge as well as a centring of the plate can be achieved.

The object of further embodiments of the invention is to provide a system and method for moving a flexible plate, in particular a printing plate or a printing plate precursor, over a support surface in the direction of a treatment station, such as a washer station, and more in particular a system and method which allow the plate to be slid over the support surface in an improved manner According to an aspect there is provided a system for moving a flexible plate, in particular a printing plate or a printing plate precursor, over a support surface in the direction of a treatment station. The system comprises a support, an articulated operating arm and a control means. The support, typically a table, is configured for supporting the plate on a support surface thereof, and intended to be located upstream of the treatment station. The articulated operating arm extends substantially parallel to the support surface and comprises at least a first segment and a second segment. The first segment has a first end which is rotatably connected to said second segment around a first rotation axis which is substantially perpendicular to the support surface, and a second end provided with a plate engagement means configured to contact the plate in such a way that a movement of the operating arm causes a sliding of the plate over the support surface. The second segment is rotatable around a second rotation axis which is substantially perpendicular to the support surface. The control means is configured to control the plate engagement means, and to control the rotation of the first and second segment of the articulated operating arm, such that the plate is slid over the support surface in the direction of the treatment station.

Such an articulated operating arm allows the plate to be slid, i.e. moved or pushed or pulled, over the support surface, whilst allowing the plate to be rotated around a first movable rotation axis and a second fixed rotation axis, resulting in any desired movement pattern of the plate. Preferably, the plate is not lifted; on the contrary it is preferred that the plate engagement means presses the plate against the support surface during the sliding of the plate over the support surface.

Preferably, the plate engagement means is configured to couple the first segment to the plate by suction, adhesion or by friction or combinations thereof. Preferably, the plate engagement means rests on the plate by gravity.

In an exemplary embodiment, the plate engagement means comprises one or more suction cups, preferably at least two suction cups. In a preferred embodiment, each suction cup has a portion intended to be in contact with the plate, said portion being made of a porous material, preferably a porous metal, ceramic or plastic. Preferably the portion intended to be in contact with the plate is substantially flat.

In another exemplary embodiment, the plate engagement means comprises one or more contact heads, preferably at least two contact heads, each head having a contact surface configured to be pushed against the plate. The control means may then configured to push the one or more contact heads against the plate such that the friction and/or adhesion between the one or more contact surfaces and the plate allows a sliding of the plate over the support surface by means of the operating arm. For example, the contact surface could be made of a material which "sticks" to the plate when a pressure is applied without causing marks on the plate. For example, pressure sensitive adhesives can be attached to the engagement means.

Preferably, the control means is configured to control the articulated arm such that a rotation over substantially 90° is performed whilst pulling or pushing the plate toward the treatment station. In that manner the orientation of the plate can be changed from a position where the shortest direction of the plate is directed in a machine transport direction to a position where the longest direction of the plate is directed in the machine transport direction, or vice versa. Especially for large plates this may be useful when a plate is transported e.g. from an exposure station to a washer station.

In an exemplary embodiment the support is a table provided with a plurality of holes, and the system further comprises a blowing means configured for blowing a gas through said holes in the direction of a plate supported on the table in order to lower the friction between the plate and the table. In this way the force needed to do the sliding of the plate over the support surface may be lower. Preferably the blowing will be done over the entire contact surface between the support surface and the plate.

According to an exemplary embodiment, the support comprises a passive ball transfer conveyor comprising a plurality of rotatably mounted balls protruding out of the support surface. The plurality of balls may be arranged along a regular grid, e.g. at equal distances of each other seen in a machine transport direction. Preferably, a distance between adjacent balls of the plurality of balls is between 5 and 50 cm. Preferably, a diameter of the plurality of balls is between 5 and 50 mm. Preferably, the plurality of balls protrude out of the support surface over a height which is smaller than 10 mm, preferably smaller than 5 mm, for example between 1 and 4 mm. Preferably, the support surface in between the plurality of balls is a flat surface. Preferably, the plate engagement means rests on the plate by gravity. When a ball is present below the plate engagement means, the plate engagement means may be slightly move upward when moving over a ball. However, as the plates are typically compressible such upward movement is usually negligible.

According to an exemplary embodiment, the support comprises at least a first and a second table portion, wherein the treatment station is a second treatment station, and wherein a first treatment station is located at an edge of the first table portion wherein said second table portion is located downstream of said first table portion as seen in a machine transport direction towards the second treatment station, wherein said first table portion is movable, preferably hinged, such that it can be removed or folded away for allowing an operator to access the first treatment station. Optionally, the support further comprises a third table portion located downstream of the second table portion, wherein the second treatment station is located at an edge of the third table portion. The third table portion may be movable, preferably hinged, such that it can be removed or folded away for allowing an operator to access the second treatment station.

The control means may comprises a first actuation means for controlling the rotation of the first segment with respect to the second segment, and a second actuation means for controlling the rotation of the second segment around the second rotation axis.

Preferably, the plate engagement means is arranged to be rotatable around a third rotation axis perpendicular on the support surface. The control means may then comprise an actuating means configured for rotating the plate engagement means around the third rotation axis. This will allow the couple the plate engagement means in any desired direction to the plate which may improve the forces exerted on the plate whilst sliding the plate over the support surface. For example, when the plate engagement means comprises two or more contact heads or suction cups arranged on a bracket, this will allow a positioning such that the bracket is perpendicular on the machine transport direction.

Preferably, at least the plate engagement means is movable in a direction perpendicular to the support surface between a contact position in which the plate engagement means is in contact with the plate and a non-contact position in which the plate engagement means is at a distance above the plate. In an exemplary embodiment only the plate engagement means is movable and not the arm segments. In another embodiment the entire operating arm may be movable in a direction perpendicular on the support surface. The control means may then comprise an actuating means configured for moving at least the plate engagement means, and optionally the entire operating arm between the contact position and the non-contact position.

According to an exemplary embodiment, the control means is configured to control the operating arm in a first operational mode such that the following sequence of steps is performed:
  coupling the plate engagement means to the plate in a first location of the plate;
  moving the plate according to a first trajectory; the first trajectory may be e.g. a substantial linear movement;
  decoupling the plate engagement means from the plate;
  coupling the plate engagement means to the plate in a second location of the plate different from the first location;
  moving the plate according to a second trajectory; optionally the moving of the plate according to a second trajectory involves a rotation of the plate over substantially 90 degrees.

Such an operational mode may be preferred for large plates which need to be rotated.

The first location may be a location near a leading edge of the plate, preferably substantially in the middle of the leading edge of the plate. The second location may be located on one side of a centre line of the plate, preferably in quarter, e.g. a leading quarter, closest to the second rotation axis. By choosing such locations the forces will be well distributed when e.g. the first trajectory is a linear movement in the machine transport direction and the second trajectory is a rotation.

According to an exemplary embodiment, the control means is configured to control the operating arm in a another operational mode such that the following sequence of steps is performed:
  coupling the plate engagement means to the plate;
  moving the plate according to a trajectory involving a rotation and/or translation of the plate;
  decoupling the plate engagement means from the plate.

In other words, it is also possible to move the plate in a continuous movement without changing the coupling location. Especially for smaller plates or for a linear movement such an operational mode may be preferred.

Preferably, the control means is configured to control the operating arm in function of the size of the plate. For example, the control means may be configured to determine if the plate is larger than a predetermined size, and to perform the sequence of steps of the first operational mode mentioned above, if it is determined that the plate is larger than the predetermined size, and to perform the sequence of steps of the other operation mode mentioned above, if it is determined that the plate is not larger than the predetermined size.

In an exemplary embodiment, the system further comprises a detection assembly configured for detecting a measure representative for a position of the plate, wherein the control means is configured for controlling the plate engagement means and/or the rotation of the first and/or second segment in function of the measure detected by the detection assembly. The detection assembly may be configured to detect if the plate is correctly aligned at the entry of the treatment station. For example, an embodiment of an apparatus with movable elements as described above may be used for this purpose.

Preferably, the articulated operating arm and the control means are configured for moving plates having a weight between 6 and 30 kg, i.e. relatively heavy plates which during the movement are resting on the support surface.

According to another aspect there is provided a method for moving a flexible plate, in particular a printing plate or a printing plate precursor, over a support surface in the direction of a treatment station, such as a washer station, said method comprising the steps of:
  supporting the plate on a support surface located upstream of the treatment station;
  sliding the plate over the support surface using an articulated operating arm extending substantially parallel to the support surface and comprising at least a first segment with a plate engagement means and a second segment rotatably connected to said first segment around a first rotation axis which is substantially perpendicular to the support surface, said second segment being rotatable around a second rotation axis which is substantially perpendicular to the support surface; wherein preferably the plate engagement means engage the plate by friction, adhesion and/or by suction;
  controlling the rotation of the first and second segment of the articulated operating arm, such that the plate is slid over the support surface in the direction of the treatment station.

In an exemplary embodiment, the step of controlling is done such that the following sequence of steps is performed: coupling the plate engagement means to the plate in a first location of the plate; moving the plate according to a first trajectory; decoupling the plate engagement means from the plate, coupling the plate engagement means to the plate in a second location of the plate different from the first location; moving the plate according to a second trajectory. Preferred features relating to this sequence have been explained above for embodiments of the system and are also applicable for the method.

In an exemplary embodiment, the step of controlling is done such that the following sequence of steps is performed: coupling the plate engagement means to the plate; moving the plate according to a trajectory involving a rotation and/or a translation of the plate; decoupling the plate engagement means from the plate.

Preferably, the step of controlling involves a controlling of the operating arm in function of the size of the plate. For example, if the plate is larger than a predetermined size, a first sequence of steps may be performed, and if it is determined that the plate is not larger than the predetermined size, and a second sequence of steps may be performed.

Optionally, the method further comprises a step of detecting a measure representative for a position of the plate, wherein the step of controlling comprises controlling the rotation of the first and/or second segment in function of the detected measure. The detecting may comprise detecting if the plate is correctly aligned at the entry of the treatment station.

BRIEF DESCRIPTION OF THE FIGURES

The accompanying drawings are used to illustrate presently preferred non limiting exemplary embodiments of the apparatus, system and method of the present invention. The above and other advantages of the features and objects of the invention will become more apparent and the invention will be better understood from the following detailed description when read in conjunction with the accompanying drawings, in which:

FIGS. 7A and 7B illustrate a top view of a exemplary embodiment of a table and a cross section of a portion of the table, respectively;

DETAILED DESCRIPTION OF EMBODIMENTS

Figure 1:
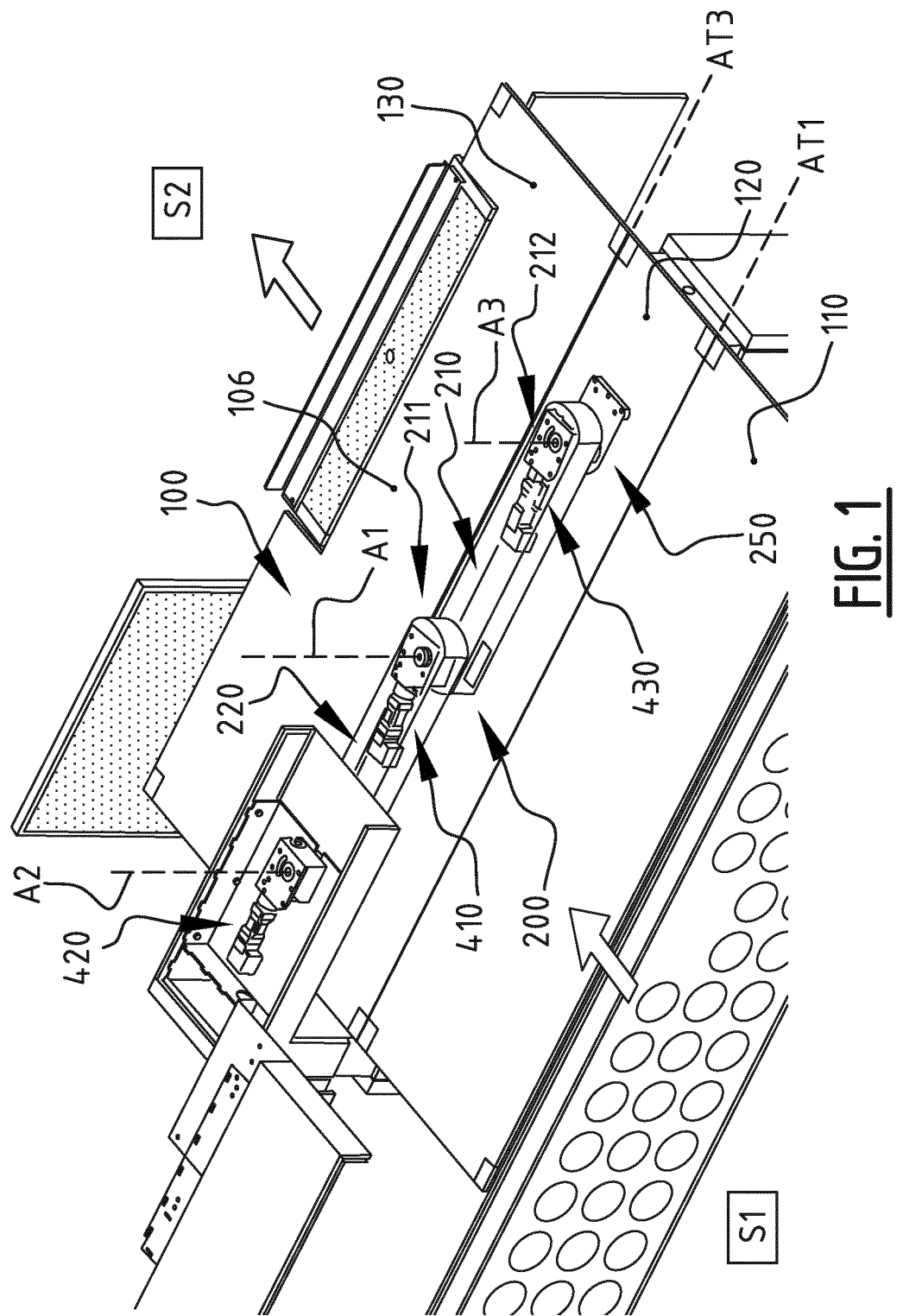
FIG. 1 is a schematic perspective view of an exemplary embodiment of a system for moving a printing plate.

FIG. 1 illustrates a system for moving a flexible plate P, in particular a printing plate or a printing plate precursor, over a support surface 106 from a first treatment station S1 (shown schematically as a rectangle) in the direction of a second treatment station S2 (shown schematically as a rectangle), such as a washer station. The system comprises a support 100, an articulated operating arm 200 and a control means 410, 420, 430. The support 100, typically a table, is configured for supporting the plate P on the support surface 106 of the table 100. The table 100 is located upstream of the second treatment station S2. The articulated operating arm 200 extends substantially parallel to the support surface 106 and comprises at least a first segment 210 and a second segment 220. The first segment 210 has a first end 211 which is rotatably connected to said second segment 220 around a first rotation axis A1 which is substantially perpendicular to the support surface 106, and a second end 212 provided with a plate engagement means 250 configured to contact the plate P in such a way that a movement of the operating arm 200 causes a sliding of the plate P over the support surface 106. The second segment 220 is rotatable around a second rotation axis A2 which is substantially perpendicular to the support surface 106. The control means 410, 420, 430 is configured to control the plate engagement means, and to control the rotation of the first and second segment 210, 220 of the articulated operating arm 200, such that the plate is slid over the support surface 106 in the direction of the second treatment station S2. Using the arm 200, the plate P can be slid, i.e. moved or pushed or pulled, over the support surface 106, whilst the plate P may be rotated around a first movable rotation axis A1 and a second fixed rotation axis A2, resulting in any desired movement pattern of the plate. Preferably, the weight of the plate engagement means 250 rests on the support surface 106 during the sliding of the plate over the support surface 106, and thus exerts a downward force on the plate P.

Preferably, the plate engagement means 250 is configured to couple the first segment to the plate by suction, adhesion or by friction or combinations thereof. Preferably, the plate engagement means rests on the plate by gravity.

In the illustrated embodiment, the support comprises a first table portion 110, a second table portion 120 and a third table portion 130. The first treatment station S1 is located at an edge of the first table portion 110. The second table portion 120 is located downstream of said first table portion 110 as seen in a machine transport direction towards the second treatment station S2. The first table portion 110 is hinged around a pivot axis AT1, such that it can be folded away for allowing an operator to access the first treatment station S1. The third table portion 130 is located downstream of the second table portion 120, and the second treatment station S2 is located at an edge of the third table portion 130. The third table portion 130 is hinged around a pivot axis AT3, such that it can be folded away for allowing an operator to access the second treatment station S2.

The control means comprises a first actuation means 410 for controlling the rotation of the first segment 210 with respect to the second segment 220, and a second actuation means 420 for controlling the rotation of the second segment 220 around the second rotation axis A2. The plate engagement means 250 is arranged to be rotatable around a third rotation axis A3 perpendicular on the support surface 106. The control means comprise an actuating means 430 configured for rotating the plate engagement means 250 around the third rotation axis A3. This will allow the couple the plate engagement means 250 in any desired direction to the plate P which may improve the forces exerted on the plate whilst sliding the plate over the support surface 106.

Either the plate engagement means 250 or the entire arm 200 may be movable in a direction perpendicular to the support surface 106 between a contact position in which the plate engagement means 250 is in contact with the plate and a non-contact position in which the plate engagement means 250 is at a distance above the plate. The control means may then comprise an actuating means (not shown) configured for moving at least the plate engagement means 250, and optionally the entire operating arm 200 between the contact position and the non-contact position.

Figure 2:
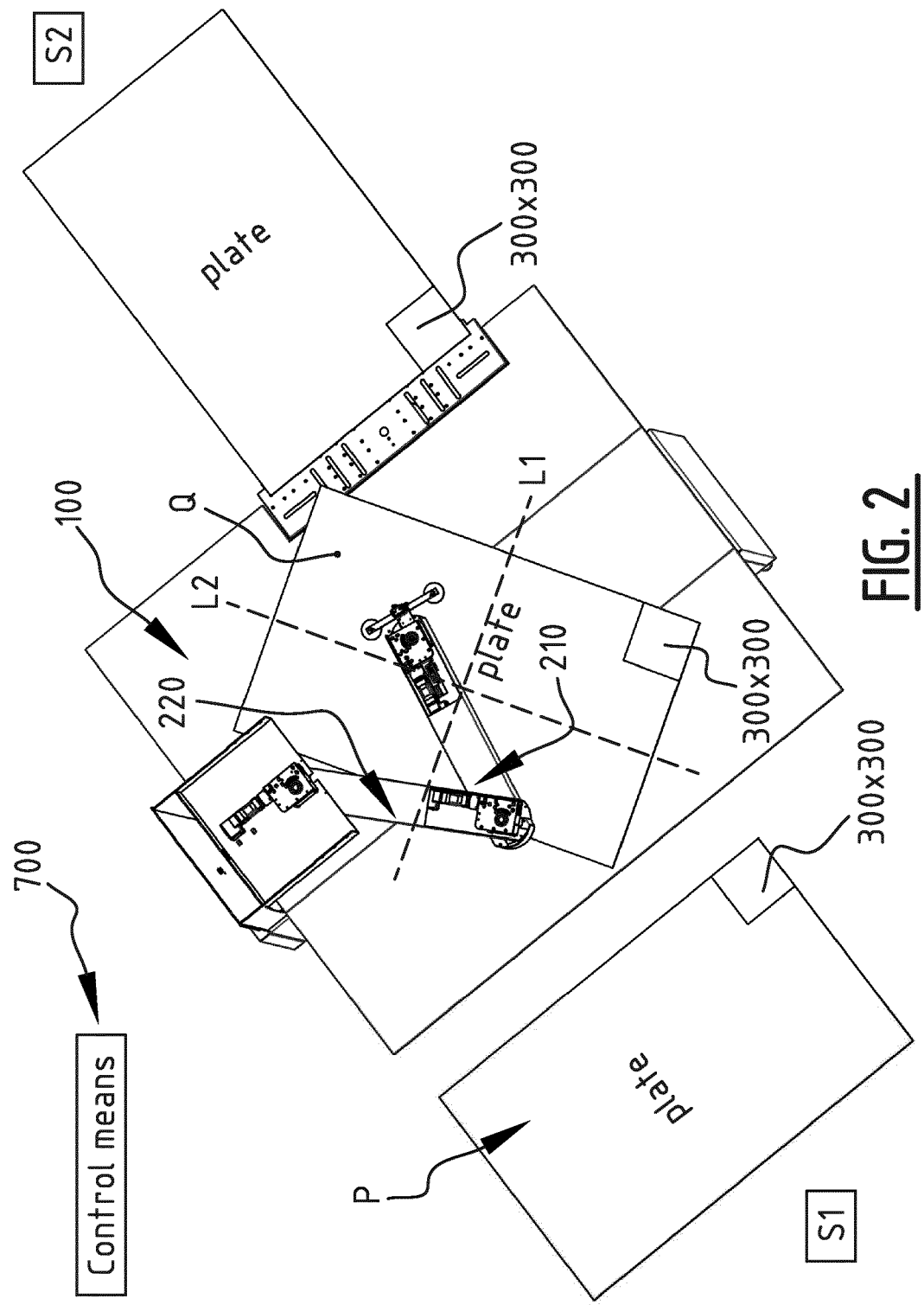
FIG. 2 is a schematic perspective view of an exemplary embodiment of another system for moving a printing plate, where the operating arm is in a position for rotating the plate.

FIG. 2 illustrates an exemplary embodiment similar to the embodiment of FIG. 1 in which identical or similar parts have been indicated with the same reference numerals. FIG.

2 illustrates that the control means may configured to control the articulated arm 200 such that a rotation of the plate P over substantially 90° is performed whilst pulling or pushing the plate P from the first treatment station S1 to the second treatment station S2. In FIG. 2 a large plate P is shown for which the orientation of the plate is changed from a position where the shortest direction of the plate is directed in a machine transport direction when coming from station S1 to a position where the longest direction of the plate is directed in the machine transport direction when entering S2.

For example, the first station S1 may be an exposure station and the second station S2 may be a washer station.

Figure 3:
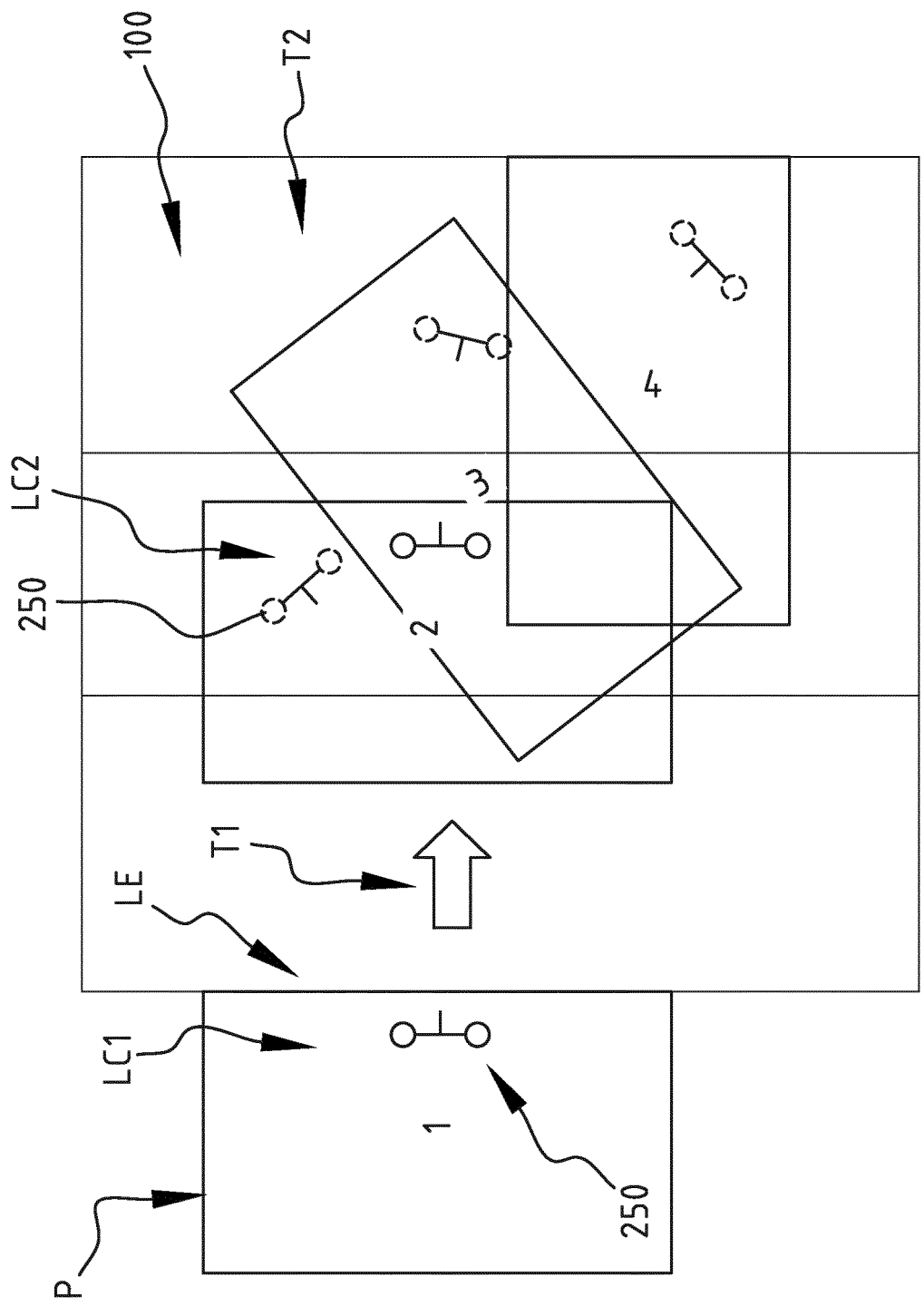
FIG. 3 is a very schematic top view of the exemplary embodiment of FIG. 2 illustrating a trajectory followed by a large printing plate.

FIG. 3 illustrates an example of a first operational mode for the embodiment of FIG. 2, where the following sequence of steps is performed:

- coupling the plate engagement means 250 to the plate P in a first location LC1 of the plate, see positon 1 of the plate on the left of FIG. 3;
- moving the plate P according to a first trajectory T1, here a substantial linear movement;
- decoupling the plate engagement means 250 from the plate; this is done in a second position 2 of the plate;
- coupling the plate engagement means 250 to the plate in a second location LC2 of the plate different from the first location, whilst the plate is still in the second position 2;
- moving the plate according to a second trajectory T2 comprising a rotation of the plate over substantially 90 degrees, see positions 3 and 4 illustrated in FIG. 3.

Such an operational mode may be used for large plates P which need to be rotated.

The first location LC1 is a location near a leading edge LE of the plate P, preferably substantially in the middle of the leading edge LE of the plate. The second location LC2 is located on one side of a centre line L1, L2 of the plate, preferably in a leading quarter Q, closest to the second rotation axis A2 (see FIG. 2). By choosing such locations the forces will be well distributed.

Figure 4:
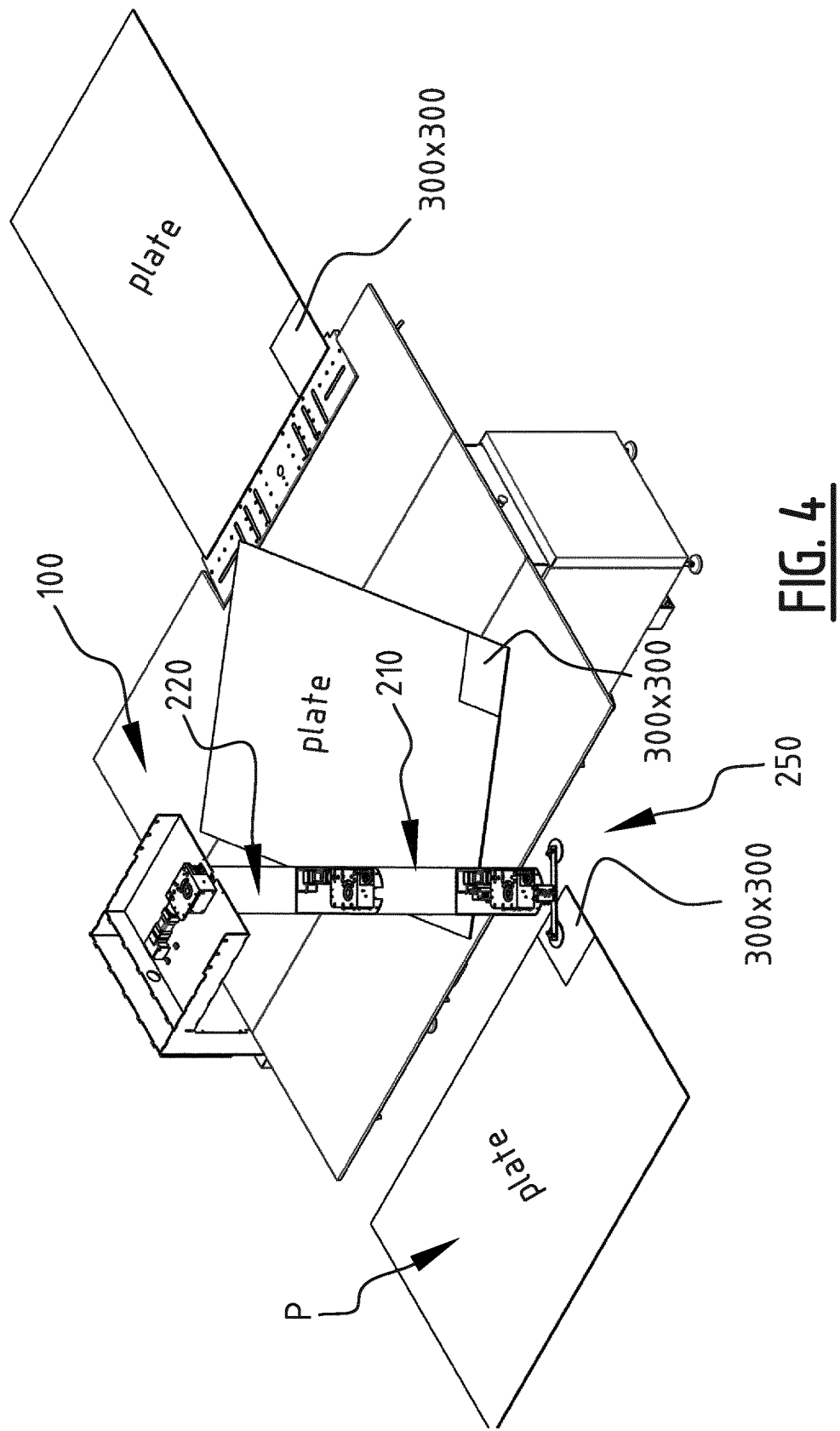
FIG. 4 is another schematic perspective view of the exemplary embodiment of FIG. 2, with the operating arm is in a position for coupling to a small plate.

FIG. 4 illustrates the embodiment of FIG. 4 in a different position of the operating arm 200. FIG. 2 illustrates that the control means may configured to control the articulated arm 200 such that for a small plate P only one of the suction means of the plate engagement means 250 (see also the description below of FIGS. 6A and 6B) is used.

Figure 5:
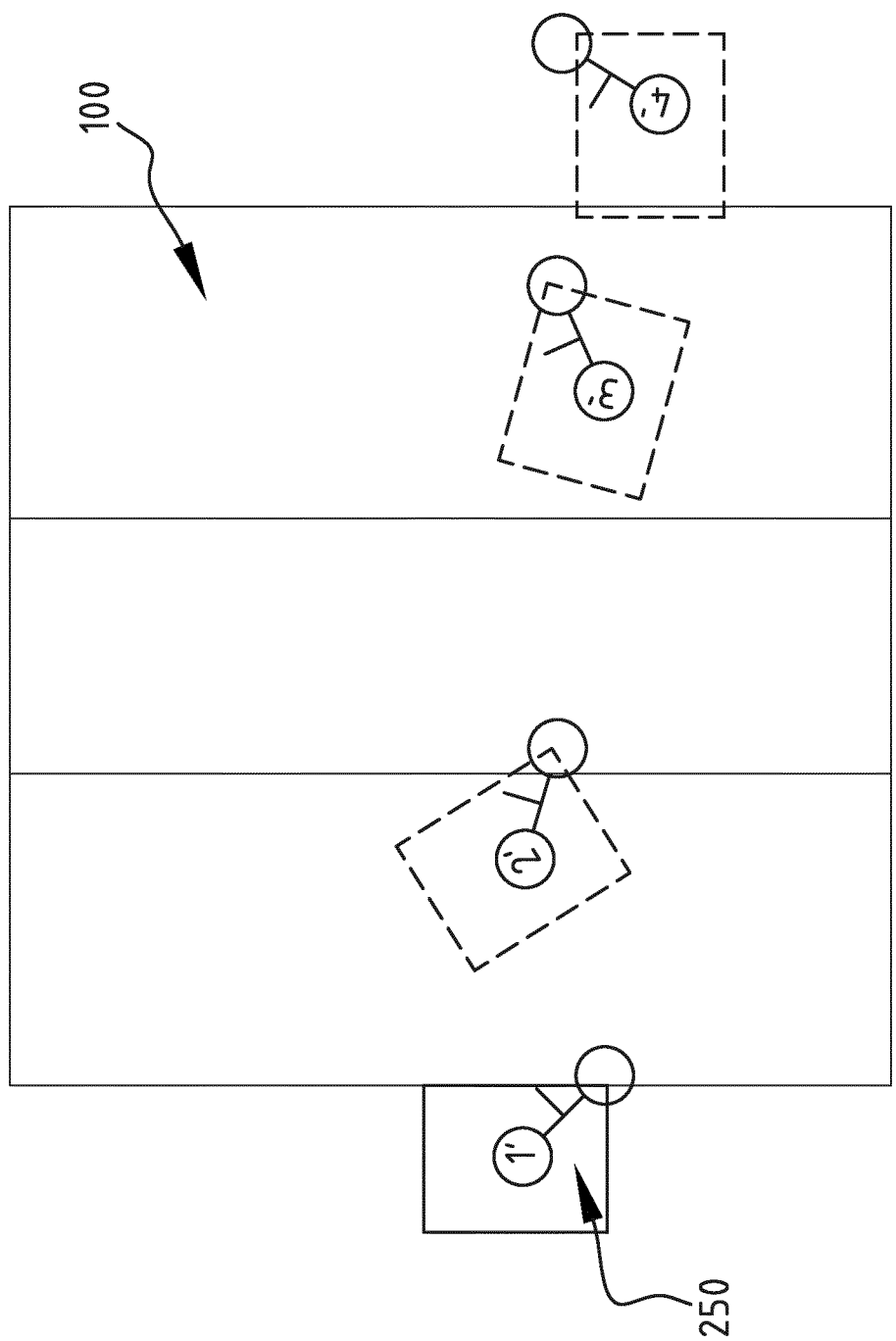
FIG. 5 is a very schematic top view of the exemplary embodiment of FIG. 4 illustrating a trajectory followed by a small printing plate.

FIG. 5 illustrates an example of a second operational mode for the embodiment of FIGS. 2 and 4, where the following sequence of steps is performed:

- coupling the plate engagement means to the plate, see plate positon 1' in FIG. 5;
- moving the plate according to a trajectory involving a rotation and translation of the plate; see plate positons 2' and 3' in FIG. 5;
- decoupling the plate engagement means from the plate, see plate positon 4' in FIG. 5.

In other words, here the plate P follows a continuous movement without changing the coupling location. Especially for smaller plates such an operational mode may be preferred.

Preferably, the control means is configured to control the operating arm 200 in function of the size of the plate P. For example, the control means may be configured to determine if the plate is larger than a predetermined size, and to perform the sequence of steps of FIG. 3, if it is determined that the plate is larger than the predetermined size, and to perform the sequence of steps of FIG. 5, if it is determined that the plate is not larger than the predetermined size.

Figure 6A:
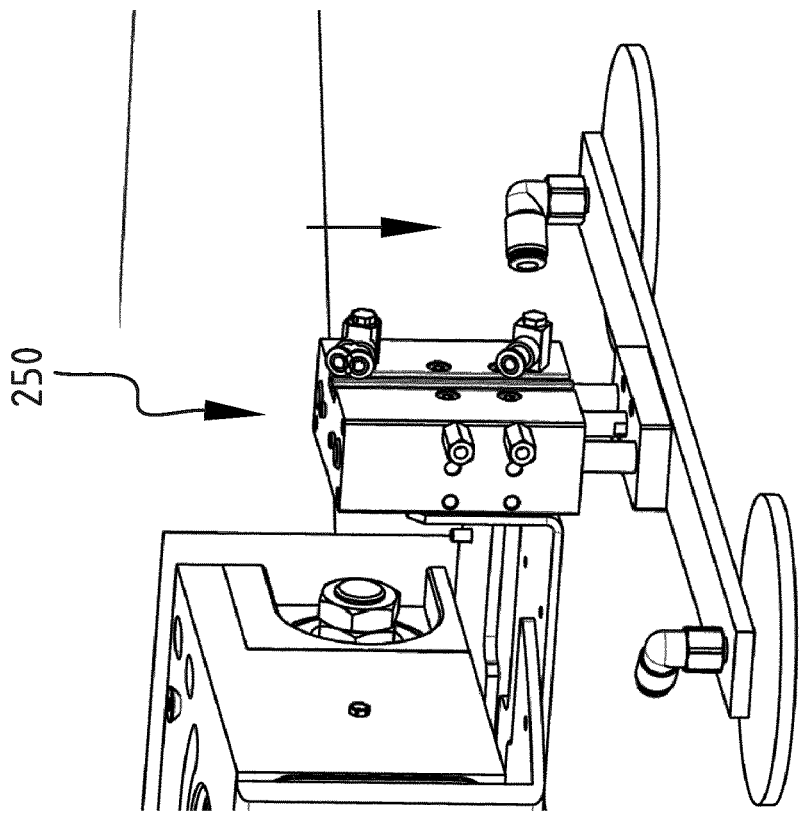
FIGS. 6A and 6B are perspective views of a plate engaging means in an upper position and a lower position, respectively.
Figure 6B:
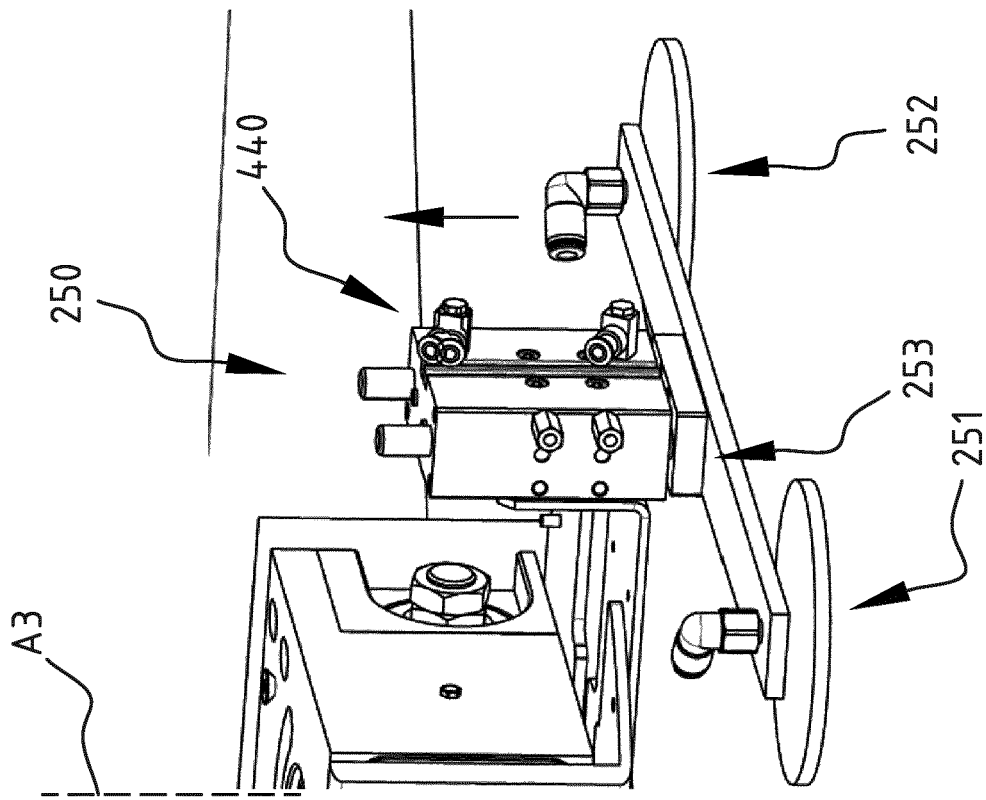

FIGS. 6A and 6B illustrate an exemplary embodiment of a suitable plate engagement means 250. The plate engaging means 250 comprises a bracket 253 on which two suction cups 251, 252 are arranged. In a preferred embodiment, each suction cup 251, 252 has a portion with a flat lower side intended to be in contact with the plate and made of a porous material, e.g. a porous metal, ceramic or plastic. However, as set out in the summary also other plate engagement means 250 may be used. For example the suction cups 251, 252 may be replaced with two contact heads, each head having a contact surface configured to be pushed against the plate. The control means may then configured to push the one or more contact heads against the plate such that the friction and/or adhesion between the heads and the plate allows a sliding of the plate over the support surface 106 by means of the operating arm 200.

In FIGS. 6A and 6B, the plate engagement means 250 is movable in a direction perpendicular to the support surface 106 between a contact position in which the plate engagement means 250 is in contact with the plate and a non-contact position in which the plate engagement means 250 is at a distance above the plate. The control means comprise an actuating means 440 configured for moving the plate engagement means 250, between the contact position and the non-contact position.

In the embodiments of FIGS. 1-5, the support table 100 may be provided with a plurality of holes (not shown), and the system may further comprises a blowing means (not shown) configured for blowing a gas through said holes in the direction of a plate P supported on the table 100 in order to lower the friction between the plate P and the table 100. In this way the force needed to do the sliding of the plate over the support surface 106 may be lower. In addition or alternatively, as illustrated in FIGS. 7A and 7B, the table 100 may comprise a passive ball transfer conveyor comprising a plurality of rotatably mounted balls 105 protruding out of the support surface 106. The plurality of balls 105 may be arranged along a regular grid, e.g. at equal distances of each other seen in a machine transport direction. Preferably, a distance between adjacent balls 105 of the plurality of balls is between 5 and 50 cm. Preferably, a diameter of the plurality of balls 105 is between 5 and 50 mm. Preferably, the plurality of balls 105 protrude out of the support surface 106 over a height which is smaller than 10 mm, preferably smaller than 5 mm, for example between 1 and 4 mm. Preferably, the support surface 106 in between the plurality of balls 105 is a flat surface.

Optionally, the system of FIGS. 1-6 further comprises a detection assembly configured for detecting a measure representative for a position of the plate, and the control means is configured for controlling the plate engagement means 250 and/or the rotation of the first and/or second segment 210, 220 in function of the measure detected by the detection assembly. The detection assembly may be configured to detect if the plate is correctly aligned at the entry of the second treatment station S2. An embodiment of a possible detection assembly will be described below.

Preferably, the articulated operating arm 200 and the control means 410, 420, 430 440 are configured for moving plates having a weight between 6 and 30 kg, i.e. relatively heavy plates which during the movement are resting on the support surface 106.

Figure 8C:
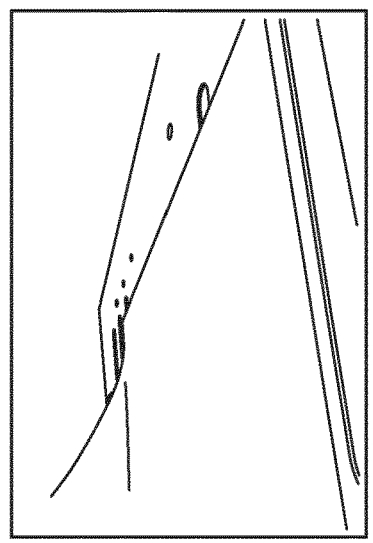
FIGS. 8A-8B illustrate perspective views of a plate moving through an exemplary embodiment of an apparatus for aligning a leading edge of a plate.
Figure 8B:
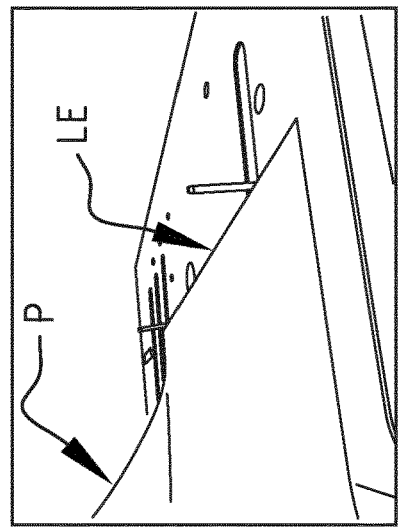
Figure 8A:
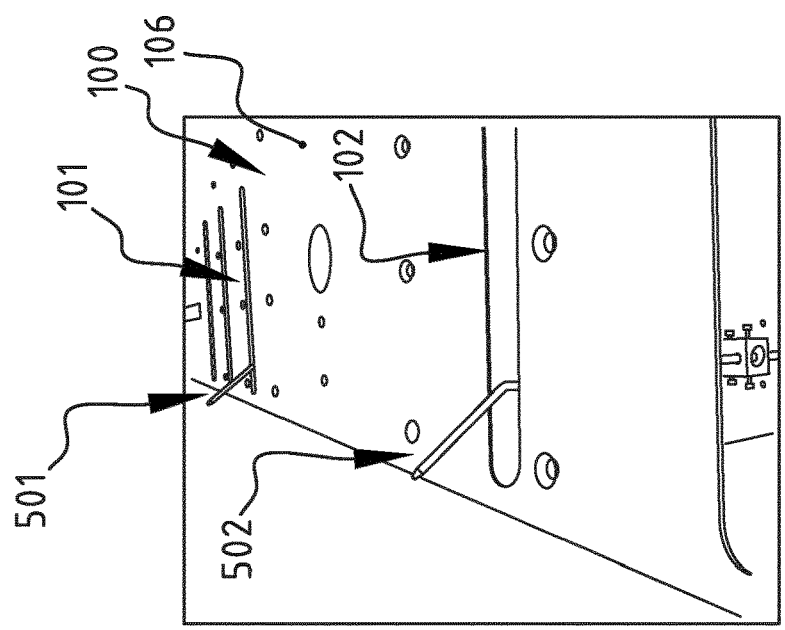
Figure 9:
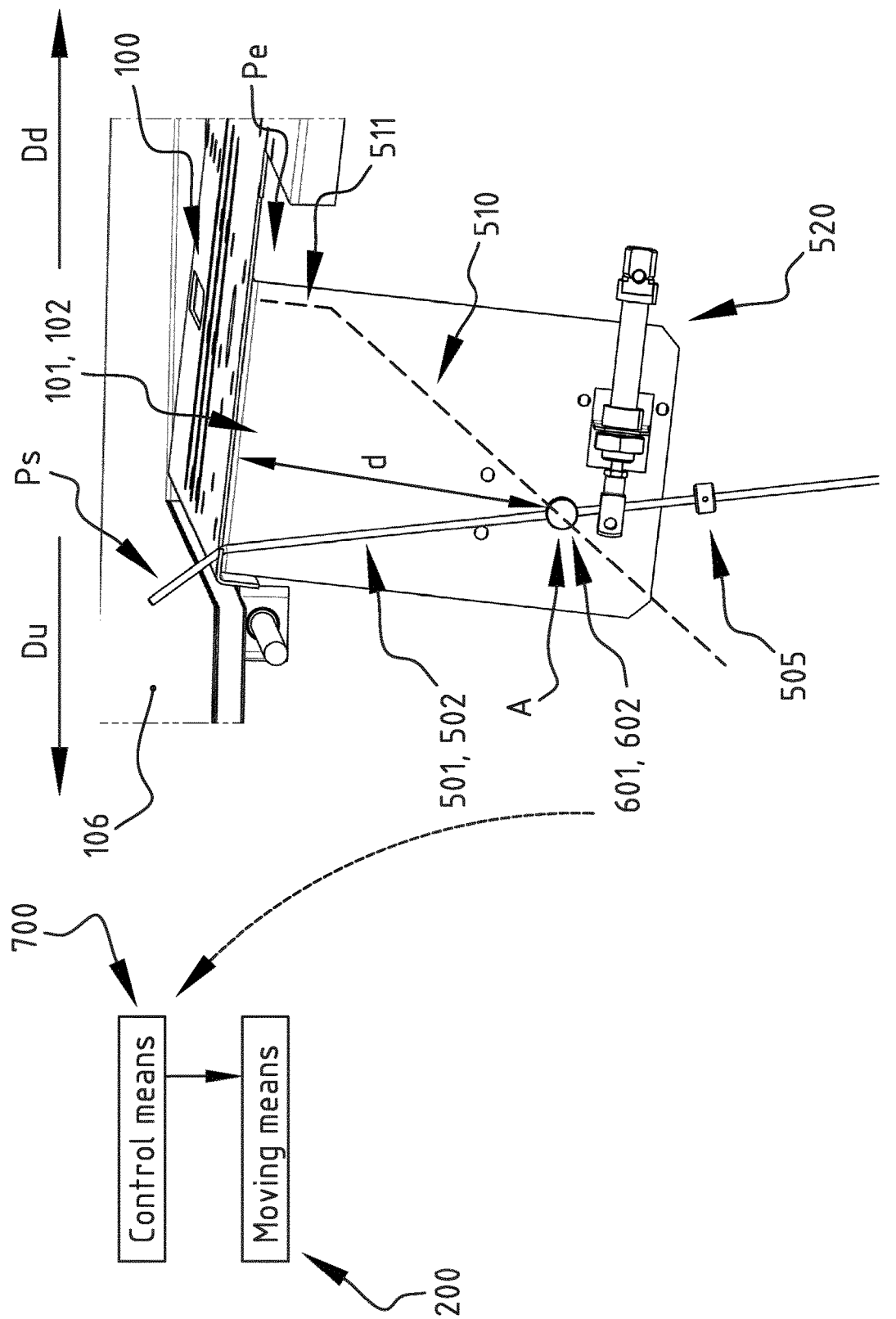
FIG. 9 is a schematic perspective view of an exemplary embodiment of an apparatus for aligning a leading edge of a plate.

FIGS. 8A-8C and FIG. 9 illustrate a first exemplary embodiment of an apparatus for aligning an edge of a plate P, in particular a printing plate or a printing plate precursor. FIGS. 8A-8C illustrate consecutive method steps, and FIG. 9 illustrates a partially cut perspective view to better illustrate a movable element 501, 502 of the apparatus. The apparatus comprises a support 100, here a table, two movable elements 501, 502, a detection means 601, 602, at least one controllable component 200 (e.g. the operating arm 200 illustrated in the FIGS. 1-6) and a control means 700. The support 100 is configured for supporting the plate in a support surface 106, and is intended to be located upstream of a treatment station, e.g. the second station S2 illustrated schematically in FIGS. 1 and 2. The two movable elements 501, 502 are arranged to be moved by the leading edge LE of the plate P. The two movable elements comprise a first and a second movable element 501, 502. The detection means 601, 602 is configured to detect a first and second measure representative for a first and second position of the first and second movable element, respectively. The at least one controllable component 200, e.g. a moving means, is configured to perform an action on the plate. The control means 700 is configured to control the at least one controllable component based on the first and second measure. For example, the movement of the plate P can be controlled by the control means in function of the first and second measure measured by the detection means 601, 602. For example, the moving means 200 may be configured to rotate the plate around an axis perpendicular on the support surface 106 in order to improve the alignment, and once the difference between the first and the second measure is below a predetermined threshold, it may be determined that the plate is aligned.

The moving means 200 may be configured to rotate the plate around an axis perpendicular on the support surface 106 and to translate the plate parallel to the support surface 106. The control means may then be configured to first translate and/or rotate the plate until the edge is in contact with the at least two movable elements, whereupon the plate may be further rotated until the difference between the first and the second measure is below a predetermined threshold, whereupon the plate may be further translated over or below the at least two movable elements.

The movable elements 501, 502 are arranged so that they protrude through the support surface 106 in a start position Ps of the movable elements 501, 502. Such an embodiment has the advantage that the movable elements will not be in the way of other components and that the detection can be done below the support surface 106.

In the embodiment of FIGS. 8A-C and 9, the movable elements 501, 502 are two pivotable pins arranged to be pivoted by the edge of the plate. Pivotable elements are easy to mount either in a support such that they protrude through the support surface 106, or above the support, and the angle over which the pivotable elements pivot, is a direct and accurate measure of the location of the contact point with the edge. The detection means 601, 602 is configured to detect a first and second measure representative for a first and second angle of the first and second pivotable pin 501, 502. The pivotable pins 501, 502 extend partially below and partially above the support surface 106 in a start position Ps, and the detection means 601, 602, e.g. an angle detection means, is provided below the support surface 106 where it is not influenced by measurement disturbing factors.

In the start position Ps before being touched by the edge of the plate, the at least two pins 501, 502 are oriented in an upstream direction Du, see FIGS. 8A and 9, preferably at an angle between 15 and 75 degrees with respect to the support surface 106. In that manner, for example, a pin can gradually move from the start position Ps in which the pin points in the upstream direction Du to a position perpendicular on the support surface 106 to an end position Pe where the pin is oriented in a downstream direction Dd and the plate can move over the pins, see FIGS. 8C and 9.

A biasing means, here a counterweight 505 attached each pivotable pin 501, 502, is configured to exert a force in the upstream direction Du against the edge of the plate. An optional further biasing means, here a piston 520, is provided to force the pivotable pins 501, 502 in the end position Pe, e.g. when the pins are not used. Preferably, the end position Pe is a position below the support surface 106 in order to avoid damage.

The pivotable pins 501, 502 are pivotally arranged around a pivot axis A, and the pivot axis is located at a distance greater than 5 cm below or above the support surface 106, preferably at a distance d greater than 10 cm below or above the support surface 106. In that manner, the plate P can move over a relatively large distance over the support surface 106 whilst maintaining in contact with the pivotable pins 501, 502. This will further improve the accuracy of the alignment of the plate.

The support 100 is a support table provided with two slits 101, 102 through which the two pivotable pins 501, 502 protrude. The slits 501, 502 are elongate slits dimensioned such that a pivotable pins can move from a start position Ps where the pin is pointing in an upstream direction Du to a position where the pin points in a downstream direction Dd, and optionally to an end position Pe where the pin is located below the support surface 106 or flush with the support surface 106.

Each pivotable pin comprises a first elongate portion 510 and a second elongate portion 511, wherein the second elongate portion 511 is at an angle between 120 and 175 degrees with respect to the first elongate portion 510. The second elongate portion 511 extends at least partially above the support surface 106 when in the start position Ps, while the first elongate portion 510 extends below the support surface 106. This allows the length of the slits to be reduced whilst still allowing the pins 501, 502 to disappear in the support 100.

Optionally, as shown in FIG. 9, the support 100 may be configured such that the support surface 106 is an inclined surface, e.g. when the treatment station downstream of the movable elements 501, 502 is a washer station.

Optionally, the at least one controllable component comprises any one or more of the following: a moving means, a punching means, a plate coupling means, a plate gripping means. The moving means 200 may be an operating arm as described before but may also comprise any one or more of the following; at least one robotic arm, a set of rollers, a set of chains, a set of belts.

Preferably, the control means 700 is configured to compare the first and the second measure, and to determine that the edge of the plate is aligned or that the plate is centered if the difference between the first and the second measure is smaller than a predetermined threshold.

Preferably, the distance between the first and the second movable element 501, 502 is in the range of 10 cm to 1000 cm, preferably 10 to 500 cm, more preferably 10 to 100 cm.

Figure 10:
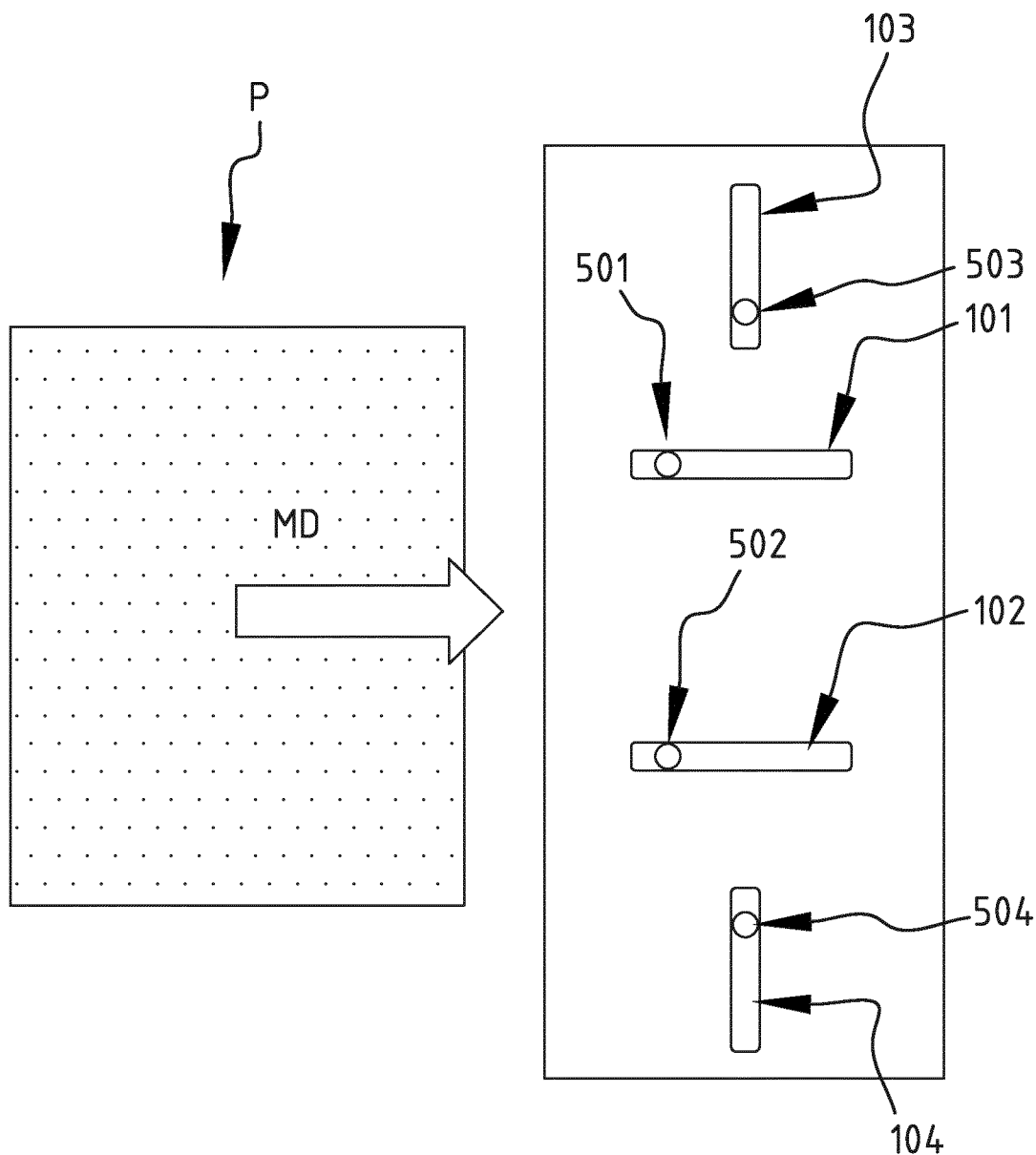
FIG. 10 is a schematic top view of another embodiment of an apparatus for aligning and/or centring a plate.

FIG. 10 illustrates in a top view an exemplary embodiment with two movable elements 501, 502 for aligning a leading edge of a plate moving in a machine transport direction, and one or two further movable elements 503, 504 for centering the plate in a direction perpendicular to the machine transport direction. It is noted that it is possible to use only one of the movable elements 503, 504. Here the movable elements 501, 502 are pivotable pins pivoting in a plane parallel to the machine transport direction and perpendicular on the support surface 106, while the further one or more pins 503, 504 used for centering the plate may pivot in a plane perpendicular to the machine transport direction and perpendicular to the support surface 106. More generally, the pivotable pins 501 may be oriented in any suitable direction depending on the detection that one wishes to perform.

Figure 11:
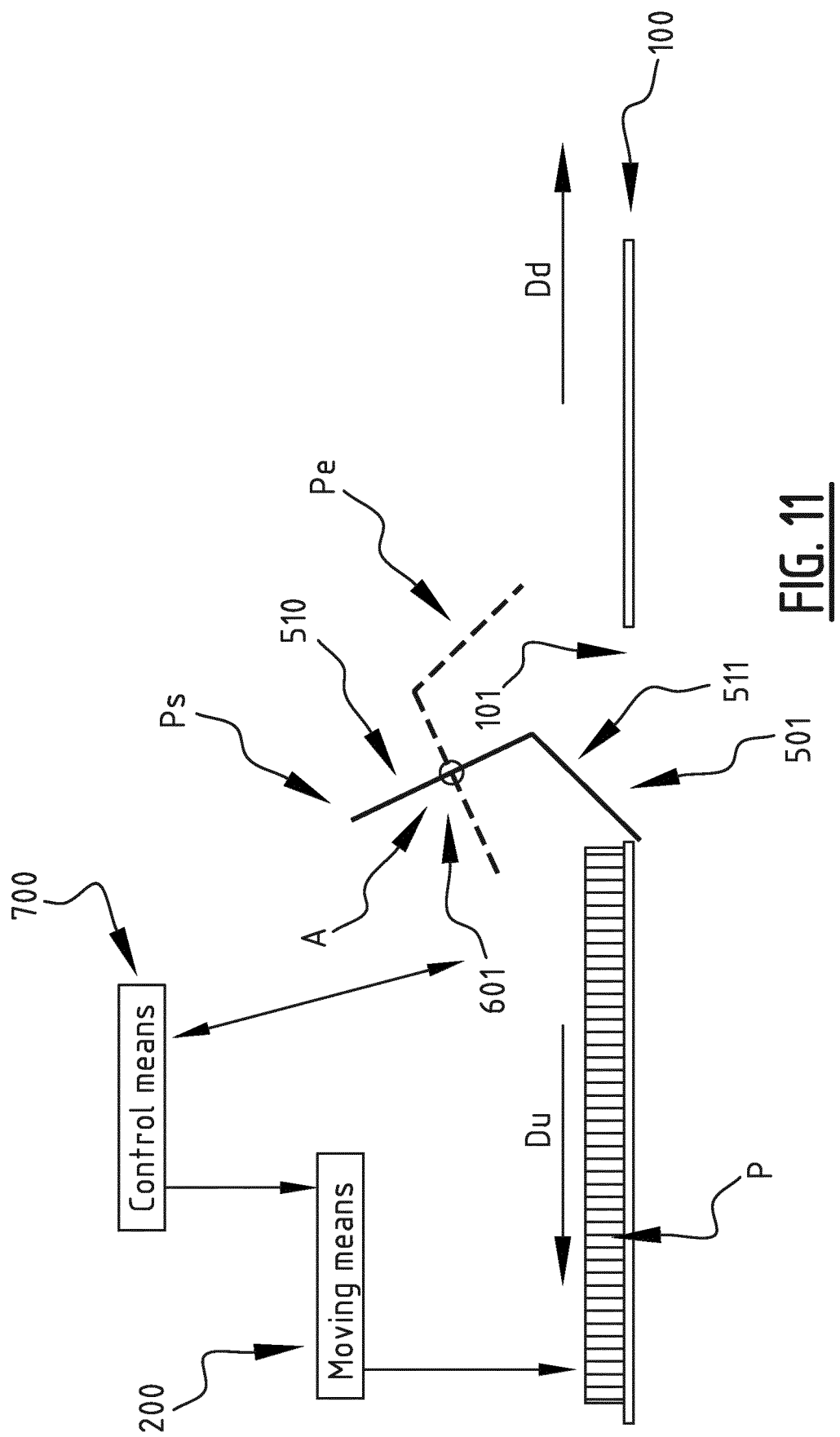
FIG. 11 is a schematic side view of another exemplary embodiment of an apparatus for aligning a leading edge of a plate.

FIG. 11 illustrates another exemplary embodiment of an apparatus for detecting or positioning an a plate P, in particular a printing plate or a printing plate precursor. The apparatus comprises a support 100, here a table, a pivotable pin 501, a detection means 601, e.g. an angle detector, a controllable component 200, and a control means 700. The support 100 is configured for supporting the plate on a support surface. The pivotable pin 501 is arranged to be moved by an edge of the plate P. The detection means 601 is configured to detect a measure representative for a position of the pivotable pin 501. The controllable component 200, e.g. a moving means, is configured to perform an action on the plate. The control means 700 is configured to control the controllable component based on the measure. For example, the moving means 200 may be configured to translate the plate in the support surface and/or to rotate the plate around an axis perpendicular on the support surface 106 in function of the measure. In this example, the pin 501 is arranged with its pivot axis above the support surface, and also the detection is done above the support surface. However, it is also possible to provide the detection means 601 below the surface. As in the embodiment of FIGS. 8A-8C, when an edge of a plate P touches the pin 501 it will move from a start position Ps to an end position Pe. Here the end position Pe is a position above the support 100, sufficiently high for a plate P to pass below. Optionally biasing means (not shown) may be provided to bias the pin 501 in the start position Ps or in the end position Pe.

Examples of suitable detection means 601, 602 include an angle sensor, a proximity switch, a photo-sensor, a mechanical switch, a magnetic switch, a camera, etc. In a preferred embodiment the detections means comprise a first and a second detector 601, 602 to perform a detection at the first and the second movable element, respectively. However, certain detection means such as a camera could look both at the first and the second movable element.

The apparatus of FIGS. 8-11 may be used in a system which further comprises a treatment station downstream of the support and configured for receiving the aligned plate. The ttreatment in the treatment station may be selected from the group comprising washing, brushing, rinsing, spraying, drying, irradiating, developing, heating, cooling, removing of material, treating with gases or liquids, sanding, cutting, treating with electromagnetic waves, ablation, measuring, and combinations thereof.

A relief plate precursor generally comprises a support layer made of a first material and an additional layer made of a second material which is different from said first material. The support layer may be a flexible metal, a natural or artificial polymer, paper or combinations thereof. Preferably the support layer is a flexible metal or polymer film or sheet. In case of a flexible metal, the support layer could comprise a thin film, a sieve like structure, a mesh like structure, a woven or non-woven structure or a combination thereof. Steel, copper, nickel or aluminium sheets are preferred and may be about 50 to 1000 µm thick. In case of a polymer film, the film is dimensionally stable but bendable and may be made for example from polyalkylenes, polyesters, polyethylene terephthalate, polybutylene terephthalate, polyamides and polycarbonates, polymers reinforced with woven, nonwoven or layered fibres (e.g. glass fibres, Carbon fibres, polymer fibres) or combinations thereof. Preferably polyethylene and polyester foils are used and their thickness may be in the range of about 100 to 300 µm, preferably in the range of 100 to 200 µm. A relief plate precursor may carry an additional layer. For example, the additional layer may be any one of the following: a direct engravable layer (e.g. by laser), a solvent or water developable layer, a thermally developable layer, a photosensitive layer, a combination of a photosensitive layer and a mask layer. Optionally there may be provided one or more further additional layers on top of additional layer. Such one or more further additional layers may comprise a cover layer at the top of all other layers which is removed before the imageable layer is imaged. The one or more additional layers may comprise a relief layer, and an anti-halation layer between the support layer and the relief layer or at a side of the support layer which is opposite of the relief layer. The one or more additional layers may comprise a relief layer, an imageable layer, and one or more barrier layers between the relief layer and the imageable layer which prevent diffusion of oxygen. Between the different layers described above one or more adhesion layers may be located which ensure proper adhesion of the different layers.

Whilst the principles of the invention have been set out above in connection with specific embodiments, it is to be understood that this description is merely made by way of example and not as a limitation of the scope of protection which is determined by the appended claims.

The invention claimed is:

1. An apparatus for aligning an edge, typically a leading edge of a plate, in particular a printing plate or a printing plate precursor, said apparatus comprising:
    a support configured for supporting the plate on a support surface, and intended to be located upstream of a treatment station;
    at least two movable elements arranged to be moved by an edge, typically a leading edge, of the plate, said at least two movable elements comprising a first and a second movable element;
    a detection means configured to detect a first and second measure representative for a first and second position of the first and second movable element, respectively,
    at least one controllable component configured to perform an action on the plate; and
    a control means configured to control the at least one controllable component based on the first and second measure;
    wherein the at least two movable elements are at least two pivotable pins arranged to be pivoted by the edge of the plate.

2. The apparatus of claim 1, wherein the at least two movable elements are arranged so that they protrude through said support surface in a start position of the at least two movable elements.

3. The apparatus of claim 1, wherein the at least one controllable component comprises a moving means configured to move the plate over the support surface, wherein preferably the control means is configured to control the moving means in function of the difference between the first and second measure; wherein preferably the moving means is configured to translate the plate parallel to the support surface and to rotate the plate around an axis perpendicular on the support surface.

4. The apparatus of claim 1, wherein the at least two pivotable pins comprise a first and a second pivotable pin, and wherein the detection means is configured to detect a first and second measure representative for a first and second angle of the first and second pivotable pin.

5. The apparatus of claim 1, wherein the at least two pins are arranged and configured such that they orient themselves in an upstream direction, when untouched by the edge of the plate, preferably at an angle between 15 and 75 degrees with respect to the support surface.

6. The apparatus of claim 2, wherein the at least two pivotable pins are pivotally arranged around a pivot axis, said pivot axis being located at a distance greater than 5 cm below the support surface, preferably at a distance greater than 10 cm below the support surface, more preferably at a distance greater than 15 cm below the support surface.

7. The apparatus of claim 1, wherein the at least two pivotable pins are movable between a start position and an end position, and wherein a biasing means, such as counterweights attached to the at least two pivotable pins or a spring means, is configured to exert a force in the upstream direction against the edge of the plate, wherein optionally a further biasing means is provided to force the at least two pivotable pins in the end position.

8. The apparatus of claim 1, wherein each pivotable pin comprises a first elongate portion and a second elongate portion, wherein the second elongate portion is at an angle between 120 and 175 degrees with respect to the first elongate portion, wherein the second elongate portion extends at least partially above the support surface when in a start position, while the first elongate portion extends below the support surface.

9. An apparatus for aligning an edge, typically a leading edge of a plate, in particular a printing plate or a printing plate precursor, said apparatus comprising:
  a support configured for supporting the plate on a support surface, and intended to be located upstream of a treatment station;
  at least two movable elements arranged to be moved by an edge, typically a leading edge, of the plate, said at least two movable elements comprising a first and a second movable element;
  a detection means configured to detect a first and second measure representative for a first and second position of the first and second movable element, respectively,
  at least one controllable component configured to perform an action on the plate; and
  a control means configured to control the at least one controllable component based on the first and second measure;
  wherein the at least two movable elements are arranged so that they protrude through said support surface in a start position of the at least two movable elements; and
  wherein the at least two movable elements and the support are configured such that the at least two movable elements can be moved below the support surface or flush with the support surface as the plate passes over the at least two movable elements.

10. The apparatus of claim 1, wherein the support is a support table provided with at least two slits through which the at least two movable elements protrude; and/or wherein the detection means is provided below the support surface; and/or wherein the at least one controllable component comprises any one or more of the following: a punching means, a plate coupling means, a plate gripping means.

11. The apparatus of claim 3, wherein the moving means comprises any one or more of the following: at least one robotic arm, a set of rollers, a set of chains, a set of belts.

12. The apparatus of claim 3, wherein the moving means comprises an articulated operating arm configured to translate and/or rotate the plate such that an edge thereof moves in the direction of the at least two movable elements; wherein preferably the moving means comprises a plate engagement means at an end of the articulate operating arm, said plate engagement means configured to contact the plate in such a way that a movement of the operating arm causes a sliding of the plate over the support surface.

13. An apparatus for aligning an edge, typically a leading edge of a plate, in particular a printing plate or a printing plate precursor, said apparatus comprising:
  a support configured for supporting the plate on a support surface, and intended to be located upstream of a treatment station;
  at least two movable elements arranged to be moved by an edge, typically a leading edge, of the plate, said at least two movable elements comprising a first and a second movable element;
  a detection means configured to detect a first and second measure representative for a first and second position of the first and second movable element, respectively,
  at least one controllable component configured to perform an action on the plate; and
  a control means configured to control the at least one controllable component based on the first and second measure;
  wherein the control means is configured to compare the first and the second measure, and to determine that the edge of the plate is aligned if the difference between the first and the second measure is smaller than a predetermined threshold; wherein preferably a distance between the first and the second movable element is in the range of 10 cm to 1000 cm, more preferably 10 to 500 cm, most preferably 10 to 100 cm.

14. A system comprising the apparatus of claim 1 and a treatment station downstream of the support and configured for receiving the aligned plate; wherein preferably the treatment station is configured for performing any one of the following treatments: cutting, ablation, exposure to electromagnetic radiation, developing, washing, brushing, rinsing, spraying, drying, irradiating, heating, cooling, removing of material, treating with gases or liquids, sanding, cutting, and combinations thereof.

15. A method for aligning an edge, typically a leading edge of a plate, preferably a printing plate or a printing plate precursor, the method comprising the steps of:
  providing a plate with at least one substantially linear edge, typically a leading edge,
  coupling the plate to a moving means,
  moving the plate over a support surface such that the edge is touching at least two movable elements using said moving means;
  detecting the movement of the at least two movable elements;
  controlling the moving means based on the result of the detecting;
  wherein the at least two movable elements are pivotable elements.

16. The method of claim 15, wherein the at least two movable elements are arranged so that they protrude through said support surface in a start position of the at least two movable elements, wherein during the moving step the at least two movable elements move from said start position to an end position; wherein preferably the step of controlling the moving means based on the result of the detecting comprises rotating and/or translating the plate until a difference in position between a first and a second movable element of the at least two movable elements is smaller than a predetermined threshold.

17. The method of claim 15, wherein the step of moving comprises moving the plate such that its leading edge contacts the at least two movable elements, and wherein the method further comprises feeding the plate to a treatment unit, when it is detected that a difference in position between a first and a second movable element of the at least two movable elements is smaller than a predetermined threshold, wherein preferably the at least two movable elements are moved into the support surface as the plate is fed to the treatment unit.

18. The method of claim 15, further comprising centering the plate with respect to an entrance of a treatment unit arranged downstream of the at least two movable elements; wherein optionally the at least two movable elements comprise a first pair of movable elements and a third movable element, and the step of moving comprises moving a leading edge against the first pair of movable elements and moving a first or second side edge of the plate against the third movable element.

19. An apparatus for detecting and/or positioning an edge a plate, in particular a printing plate or a printing plate precursor, said apparatus comprising:

a support configured for supporting the plate in a support surface, and intended to be located upstream of a treatment station;

at least one pivotable pin arranged to be moved by an edge of the plate, wherein preferably the at least one pivotable pin protrudes through said support surface;

a detection means configured to detect at least one measure representative for a position of the at least one pivotable pin, wherein preferably the detection means is arranged below the support surface, at least one controllable component configured to perform an action on the plate; and a control means configured to control the at least one controllable component based on the at least one measure.

* * * * *